E. G. COOK.
HAY PRESS.
APPLICATION FILED JUNE 4, 1912.

1,044,142.

Patented Nov. 12, 1912.

WITNESSES

INVENTOR
E.G. COOK.

UNITED STATES PATENT OFFICE.

EARL GOODWIN COOK, OF PINCHER STATION, ALBERTA, CANADA.

HAY-PRESS.

1,044,142. Specification of Letters Patent. Patented Nov. 12, 1912.

Application filed June 4, 1912. Serial No. 701,485.

*To all whom it may concern:*

Be it known that I, EARL GOODWIN COOK, of the village of Pincher Station, in the Province of Alberta, Canada, have invented certain new and useful Improvements in Hay-Presses, of which the following is the specification.

My invention relates to improvements in hay presses and the object of the invention is to devise a simple efficient form of tucking device which will not be liable to breakage and which will tuck the ends of the hay evenly into the bale and it consists essentially of an arm extending from each of the lower links of the toggle movement of the hay press plunger, a slotted link connected to the arm and extending forwardly to each side of the feed hopper of the press, a roller journaled across the front of the feed hopper, a slot located immediately behind the roller, an arc-shaped tucking plate pivotally connected at its upper end to the aforesaid links, and projections extending from a suitable portion of the hay press into the slots of the links to support the links as hereinafter more particularly explained by the following specification.

Figure 1:
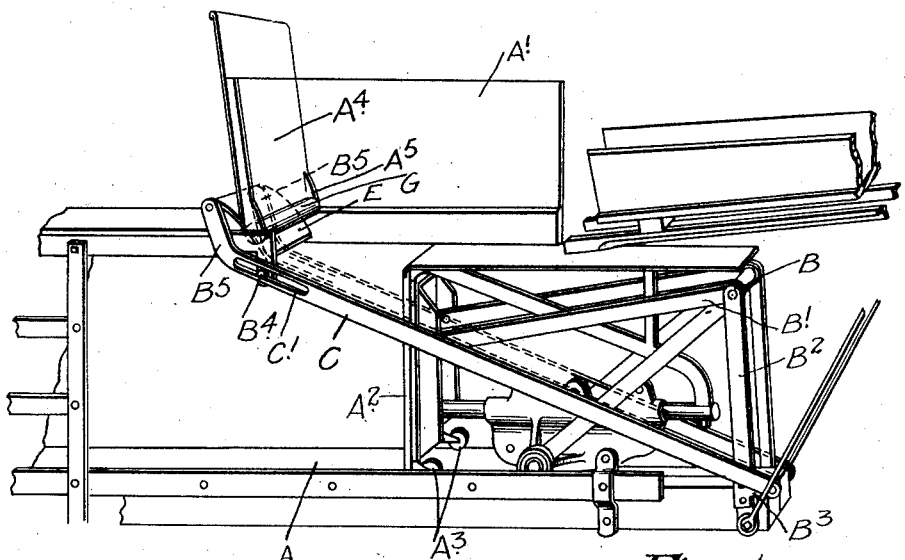
Figure 2:
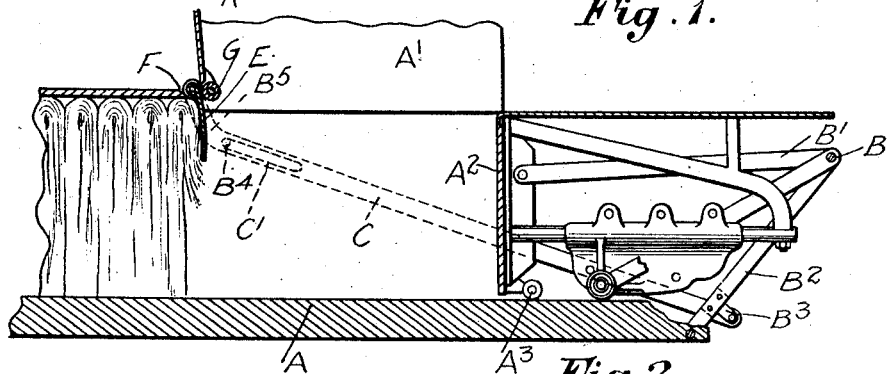
Figure 3:
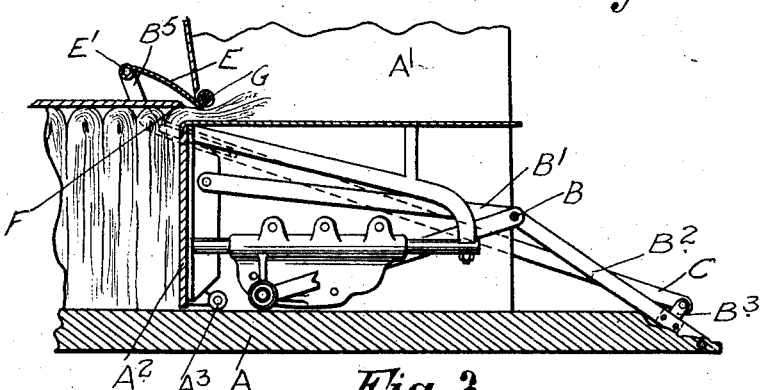

Figure 1, is a general perspective view of a hay press showing my device attached thereto. Fig. 2, is a longitudinal section through Fig. 1 showing the hay press plunger in its rearward or inoperative position and the tucking plate in its operative position. Fig. 3, is a similar view to Fig. 2 showing the plunger in its operative position and the tucking plate withdrawn.

In the drawings like letters of reference indicate corresponding parts in each figure.

A is the main frame of the press provided with the usual feed hopper A' and baling plunger $A^2$ supported on rollers $A^3$ operated in the usual manner.

B is the toggle connection connecting the plunger $A^2$ to the hay press frame A. The toggle connection B comprises the upper links B' and the lower links $B^2$.

$B^3$ are arms extending from the links $B^2$.

$B^4$ are pins extending from a suitable portion of the frame at each side of the hopper A'.

C are slotted links pivotally connected at their lower ends to the arms $B^3$ and having up-turned upper ends $B^5$. It will be seen by referring to Fig. 1 of the drawings that the pins $B^4$ extend through the slots C' of the link C thus slidably supporting the links.

E is an arc-shaped tucking plate provided with trunnions E' at its upper end pivoted in the extreme end of the up-turned portion $B^5$ of the link C.

F is a slot formed in the upper portion of the frame of the press immediately in front of the front plate $A^4$ of the hopper A'.

$A^5$ are lugs secured to or forming part of the front plate $A^4$.

G is a roller journaled between the lugs $A^5$.

Having described the principal parts involved in my invention I will briefly describe the operation of the same.

The plunger $A^2$ reciprocates backwardly and forwardly beneath the opening of the feed hopper A' so as to force the hay fed through the opening into the bale in the usual manner. By the forward movement of the plungers, the link C is also carried forwardly raising the tucking plate E into the position shown in Fig. 3. As the plunger recedes the tucking plate E is carried inwardly and downwardly again between the roller G and the ends of the hay which protrude from the bale into the hopper opening. By the downward movement of the tucking plate E its ends are carried downwardly and tucked into the bale as shown in Fig. 2 of the drawings.

From this description it will be seen that I have devised a very simple device in a hay press for efficiently tucking the loose ends of the hay into the bale so that such ends will be tucked evenly when the bale is compressed by the next supply of hay fed from the feed hopper and the bale compressed evenly from the top to the bottom.

What I claim as my invention is:

1. In a hay press, a slotted main frame having the usual feed hopper and the reciprocating plunger, a front plate having a roller journaled in advance of the slot in the main frame, an arc shaped tucking plate pivotally supported at one end above the frame, and means actuating the plunger adapted to cause said tucking plate to go into and out of said slot adjacent said roller.

2. In a hay press, the combination with the main frame thereof having the usual feed hopper and the reciprocating plunger having the usual toggle connection to the main frame, of an arm extending from such toggle connection, pins extending from the main frame, links connected to the aforesaid arm at their lower end and having slots therein through which the aforesaid pins extend, an arc-shaped tucking plate pivotally connected to the upper ends of the links, and means for supporting the tucking plate against the free protruding ends of the hay extending from the bale, as and for the purpose specified.

3. In a hay press, the combination with the main frame having the usual feed hopper opening and a slot extending across the top of the frame in front of the feed hopper opening, a roller journaled in front of the feed hopper opening and to the rear of the slot, and a reciprocating plunger having the usual toggle joint connection to the main frame, of arms extending from the toggle, slidably supported links pivotally connected at one end to the arms and having up-turned upper ends, and an arc-shaped tucking plate pivotally connected at its upper end between the up-turned ends of the slotted links and having its outer face bearing against the roller located in front of the feed hopper opening, as and for the purpose specified.

4. In a hay press, a slotted main frame having the usual feed hopper and the reciprocating plunger, operating means for the plunger, a tucking plate pivotally supported at one end above the slot in the frame to the plunger operating means, whereby when said plunger is withdrawn the free edge of said tucking plate will be caused to move downwardly and forwardly through the slot in the main frame.

EARL GOODWIN COOK.

Witnesses:
MARY MARCELLUS,
ARTHUR C. KEMMIS.

Copies of this patent may be obtained for five cents each, by addressing the "Commissioner of Patents, Washington, D. C."